United States Patent
Reitz

(10) Patent No.: US 9,374,656 B2
(45) Date of Patent: Jun. 21, 2016

(54) METHOD AND APPARATUS FOR AUTOMATICALLY PAIRING A MOBILE ENDPOINT DEVICE TO AN OUTPUT DEVICE USING A CARD SWIPE AUTHENTICATION

(71) Applicant: Xerox Corporation, Norwalk, CT (US)

(72) Inventor: Jeremy L. Reitz, Marion, NY (US)

(73) Assignee: Xerox Corporation, Norwalk, CT (US)

(*) Notice: Subject to any disclaimer, the term of this patent is extended or adjusted under 35 U.S.C. 154(b) by 121 days.

(21) Appl. No.: 13/834,886

(22) Filed: Mar. 15, 2013

(65) Prior Publication Data

US 2014/0273957 A1  Sep. 18, 2014

(51) Int. Cl.
| | |
|---|---|
| H04M 1/66 | (2006.01) |
| H04W 4/00 | (2009.01) |
| H04W 12/06 | (2009.01) |
| H04L 29/06 | (2006.01) |
| G06F 21/34 | (2013.01) |
| G06F 21/44 | (2013.01) |
| G06F 21/60 | (2013.01) |
| G06F 3/12 | (2006.01) |

(52) U.S. Cl.
CPC ............. *H04W 4/008* (2013.01); *G06F 21/34* (2013.01); *G06F 21/44* (2013.01); *G06F 21/608* (2013.01); *H04L 63/0853* (2013.01); *H04W 12/06* (2013.01); *G06F 3/1285* (2013.01); *G06F 3/1292* (2013.01); *G06F 2221/2117* (2013.01)

(58) Field of Classification Search
CPC ..... G06F 3/1285; G06F 3/1286; G06F 3/1287; G06F 3/1288; G06F 3/129; G06F 3/1292
USPC ........... 455/418, 419, 420, 410, 411; 358/1.1, 358/1.14, 1.15
See application file for complete search history.

(56) References Cited

U.S. PATENT DOCUMENTS

| | | | |
|---|---|---|---|
| 7,206,803 B1* | 4/2007 | Bendel et al. ............... 709/202 |
| 2004/0073684 A1* | 4/2004 | Jodra et al. ................. 709/228 |
| 2004/0239992 A1* | 12/2004 | Kawai et al. ................ 358/1.15 |
| 2005/0138065 A1* | 6/2005 | Ciriza ......................... 707/104.1 |
| 2009/0103124 A1* | 4/2009 | Kimura ................ G06F 3/1204 358/1.15 |
| 2011/0058208 A1* | 3/2011 | Takahashi .................... 358/1.15 |
| 2012/0069385 A1* | 3/2012 | Von Hatten et al. ......... 358/1.15 |

* cited by examiner

*Primary Examiner* — Thai Vu

(57) ABSTRACT

A method, non-transitory computer readable medium, and apparatus for automatically pairing a mobile endpoint device to an output device using a card swipe authentication are disclosed. For example, the method detects a card swipe of an access card at the output device, determines that the mobile endpoint device associated with the access card is authorized for remote user interface (UI) access of the output device, establishes a secure session between the mobile endpoint device and the output device, sends a notification to the mobile endpoint device, wherein the notification comprises configuration information that was used to establish the secure session and pair the output device to the mobile endpoint device, receives a command from the mobile endpoint device via the secure session and forwards the command to the output device to execute the command.

10 Claims, 4 Drawing Sheets

METHOD AND APPARATUS FOR AUTOMATICALLY PAIRING A MOBILE ENDPOINT DEVICE TO AN OUTPUT DEVICE USING A CARD SWIPE AUTHENTICATION

The present disclosure relates generally to pairing a mobile endpoint device to an output device and, more particularly, to a method and an apparatus for automatically pairing a mobile endpoint device to an output device using a card swipe authentication.

BACKGROUND

Currently, a user typically operates an output device locally with the interface of the output device. In some instances it may be beneficial for a user to try and operate the output device remotely. However, pairing a second device to the output device may be complicated and the user may not know how to configure the second device or how to find the output device on the second device to establish the remote connection.

Furthermore, in some instances the output device may be overly complicated. For example, a user may not know where buttons to execute certain features or functions are located or how to even go about performing the features or functions on the output device.

SUMMARY

According to aspects illustrated herein, there are provided a method, a non-transitory computer readable medium, and an apparatus for automatically pairing a mobile endpoint device to an output device using a card swipe authentication. One disclosed feature of the embodiments is a method that detects a card swipe of an access card at the output device, determines that the mobile endpoint device associated with the access card is authorized for remote user interface (UI) access of the output device, establishes a secure session between the mobile endpoint device and the output device, sends a notification to the mobile endpoint device, wherein the notification comprises configuration information that was used to establish the secure session and pair the output device to the mobile endpoint device, receives a command from the mobile endpoint device via the secure session and forwards the command to the output device to execute the command.

Another disclosed feature of the embodiments is a non-transitory computer-readable medium having stored thereon a plurality of instructions, the plurality of instructions including instructions which, when executed by a processor, cause the processor to perform a method that detects a card swipe of an access card at the output device, determines that the mobile endpoint device associated with the access card is authorized for remote user interface (UI) access of the output device, establishes a secure session between the mobile endpoint device and the output device, sends a notification to the mobile endpoint device, wherein the notification comprises configuration information that was used to establish the secure session and pair the output device to the mobile endpoint device, receives a command from the mobile endpoint device via the secure session and forwards the command to the output device to execute the command.

Another disclosed feature of the embodiments is an apparatus comprising a processor that is configured to detect a card swipe of an access card at the output device, determine that the mobile endpoint device associated with the access card is authorized for remote user interface (UI) access of the output device, establish a secure session between the mobile endpoint device and the output device, send a notification to the mobile endpoint device, wherein the notification comprises configuration information that was used to establish the secure session and pair the output device to the mobile endpoint device, receive a command from the mobile endpoint device via the secure session and forwards the command to the output device to execute the command.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for automatically pairing a mobile endpoint device to an output device using a card swipe authentication. As discussed above, a user typically operates an output device locally with the interface of the output device. In some instances it may be beneficial for a user to try and operate the output device remotely. However, pairing the second device to the output device may be complicated and the user may not know how to configure the second device or how to find the output device on the second device to establish the remote connection.

One embodiment of the present disclosure provides a card swipe authentication to automatically pair a mobile endpoint device to an output device. For example, an access card can be used to provide authentication credentials such that a user can enter a building can also be used to provide authentication credentials to access an output device (e.g., a printer, copying machine, computer, multi-function device, and the like). In one embodiment, authentication information for entitlement of services on the output device can be linked with the authentication credentials of the user stored on the card to automatically pair a mobile endpoint device of the user and the output device and to establish a secure session for communication between the mobile endpoint device and the output device.

In other words, the user may not need to know how to configure the mobile endpoint device to pair it with the output device. Rather, the pairing may be initiated and automatically performed upon detection of the card swipe so that the mobile endpoint device and the output device may communicate over the secure session.

In addition, the mobile endpoint device may install a software application that allows the mobile endpoint device to send commands over the secure session to the output device. In one embodiment, the software application may have a customizable user interface (UI). For example, if the user has a particular format for printed documents the user may have a print button on the UI of the software application running on the mobile endpoint device that automatically sends the correct commands to the output device to print the document in the desired format.

In other words, the user need not be familiar with the capability or UI of the output device. Rather, the user may simply send customized commands from the UI of the mobile endpoint device and the command may be forwarded to the output device for execution. As a result, pairing of the mobile endpoint device with the output device and interaction with the output device is simplified for the user and a more satisfying user experience can be provided.

Figure 1:
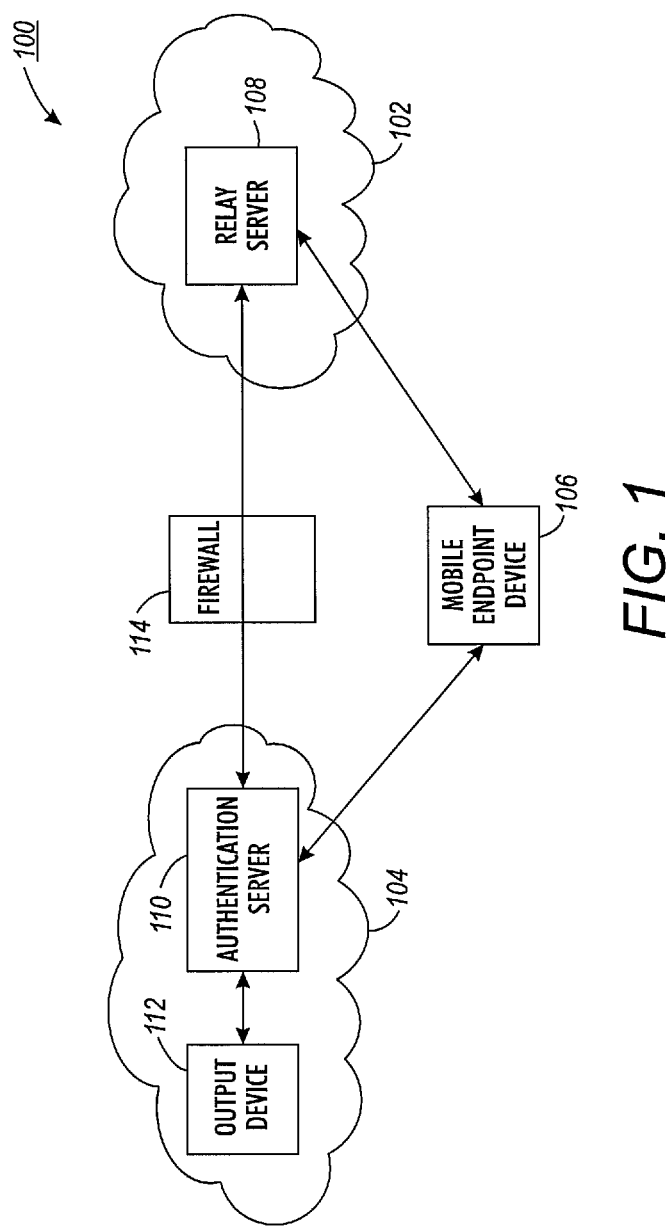
FIG. 1 illustrates one example of a communication network of the present disclosure.

To better understand the present disclosure, FIG. 1 illustrates an example of a communication network 100. In one embodiment, the communication network 100 may include a packet network such as an Internet Protocol (IP) network 102 and a local area network (LAN) 104. The IP network 102 may provide a remote path for a mobile endpoint device 106 to communicate with an output device 112. The IP network 102 may be, for example, a cellular communication network, the Internet, a service provider network, an access network, a core network, and the like.

In one embodiment, the IP network 102 may include a relay server 108. In one embodiment, the relay server 108 may include a database or memory for storing registration of one or more mobile endpoint devices 106, registration of one or more authentication servers 110, one or more communication protocols for communicating with the mobile endpoint devices 106, one or more communication protocols for communicating with the authentication servers 110, user authentication information, which mobile endpoint devices 106 the user is associated with, and the like.

In one embodiment, the relay server 108 may be embodied as a general computing device as described below and illustrated in FIG. 5. Although only a single relay server 108 is illustrated in FIG. 1, it should be noted that any number of relay servers may be deployed. In addition, multiple relay servers may be located together or distributed across different geographic locations. Although the relay server 108 is illustrated as being in the IP network 102, the relay server 108 may be in communication with the IP network 102, but located outside of the IP network 102.

The LAN 104 may provide a local path for the mobile endpoint device 106 to communicate with the output device 112. In one embodiment, the LAN 104 may be a Wi-Fi network, a personal area network (PAN), and the like.

In one embodiment, the LAN 104 may include an authentication server 110. In one embodiment, the authentication server 110 may include a database or memory for storing authentication credentials of a user, what output devices 112 the user may have access to, when a user may have access to the authorized output devices 112, what level of access the user may have to the authorized output devices 112, and the like.

In one embodiment, the authentication server 110 may be embodied as a general computing device as described below and illustrated in FIG. 5. Although only a single authentication server 110 is illustrated in FIG. 1, it should be noted that any number of authentication servers may be deployed. Although the authentication server 110 is illustrated as being in the LAN 104, the authentication server 110 may be in communication with the LAN 104, but located outside of the LAN 104.

In one embodiment a firewall 114 may be deployed between the LAN 104 and IP network 102 for security. It should be noted that the communication network 100 has been simplified. For example, the network 100 may include other network elements such as border elements, routers, switches, policy servers, security devices, firewalls, a content distribution network (CDN), and the like. In addition, the communication network 100 may include additional networks between the IP network 102, the LAN 104 and the mobile endpoint device 106, such as different access networks.

In one embodiment, the mobile endpoint device 106 may be in communication with the IP network 102 and the LAN 104. For example, the mobile endpoint device 106 may have cellular data capability to communicate over a cellular communication network of the IP network 102. Alternatively, the mobile endpoint device 106 may be a Wi-Fi enabled device and communicate over a Wi-Fi network of the LAN 104. As a result, the mobile endpoint device 106 may be capable of communicating with the output device 112 over either a remote path (e.g., the IP network 102) or a local path (e.g., the LAN 104).

It should be noted that although only a single mobile endpoint device 106 is illustrated, it should be noted that any number of mobile endpoint devices may be deployed. In one embodiment, the mobile endpoint device may be any device that may communicate with the IP network 102 and the LAN 104 over a wired or wireless connection. In one embodiment, the mobile endpoint device 106 may be a laptop computer, a mobile endpoint device, a smart phone, a tablet computer, a netbook computer, and the like. In one embodiment, the mobile endpoint device may be embodied as a general computing device discussed below and illustrated in FIG. 5.

In one embodiment, the output device 112 may be any type of output device, such as for example, a printer, a copier, a multifunction device, a fax machine, a computer, and the like. The output device 112 may be a locked device that has limited access and requires authentication of a user. For example, the output device 112 may have a local card reader or card swipe. In one embodiment, the output device 112 may be in communication with the authentication server 110 via a wired or wireless connection.

A user may access the output device 112 by swiping his or her authentication card at the local card reader. The detection of the card swipe may initiate a communication from the output device 112 to the authentication server 110 to determine if a user is authorized to access the output device 112 and what level of access the user may have to the output device 112.

In one embodiment, the present disclosure leverages the card swipe to also automatically pair the output device 112 to the mobile endpoint device 106 that is pre-registered for communication over a secure session. As a result, the user need not have any a priori knowledge of any configuration information of the output device 112 or provide any information to the mobile endpoint device 106 about the output device 112.

In addition, the user may customize a software application downloaded on the mobile endpoint device 106 to remotely control the output device 112 and send commands that are executed by the output device 112. As a result, the user need not know or be familiar with the UI of the output device 112. Thus, the user is provided a simple and satisfying user experience with the output device 112.

In addition, the present disclosure provides a scalable approach to remotely controlling the output device 112. For example, specific UIs for specific brands of output devices 112 need not be built. Rather, only a single generic software application needs to be created that is compatible with the mobile endpoint device 106 to automatically pair the mobile endpoint device 106 with any output device 112.

Figure 2:
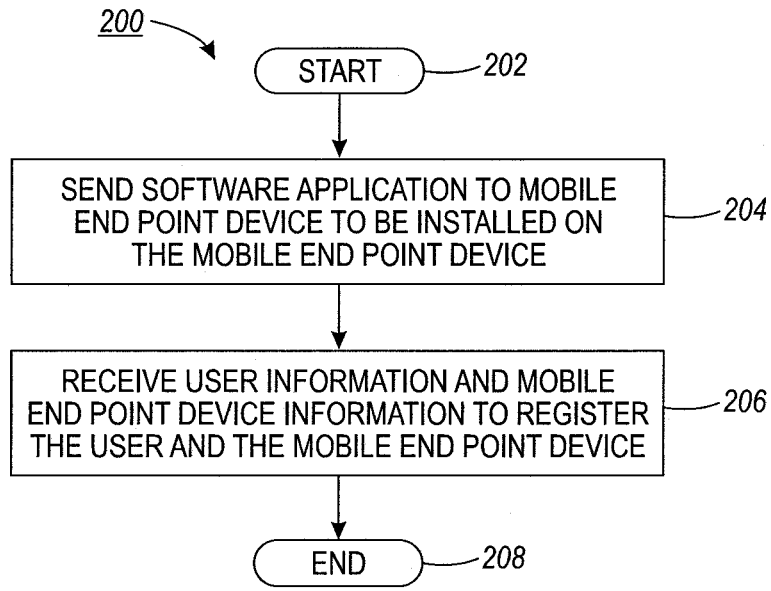
FIG. 2 illustrates an example flowchart of one embodiment of a method for registering a mobile endpoint device.

FIG. 2 illustrates a flowchart of a method 200 for registering a mobile endpoint device. In one embodiment, the method 200 may be performed by the relay server 108 or a general-purpose computer as illustrated in FIG. 5 and discussed below.

The method 200 begins at step 202. At step 204, the method 200 may send a software application to the mobile endpoint device to be installed on the mobile endpoint device. For example, the software application may be made available on an app store that the user may download and install on his or her mobile endpoint device. In another embodiment, the mobile endpoint device may request the software application directly from the relay server. In yet another embodiment, the mobile endpoint device may request the software application from a web interface.

At step 206, the method 200 receives user information and mobile endpoint device information to register the user and the mobile endpoint device. For example, the user may provide his or her name and contact information. The user may also select a username and password to log into the software application. The mobile endpoint device information may include a name of the mobile endpoint device, an address (e.g., a Media Access Control (MAC) address, an IP address, and the like), a model type, a software or operation system version, one or more communication protocols used by the mobile endpoint device, and the like.

In one embodiment, after the user registers the mobile endpoint device, the user may configure one or more commands on the software application on his or her mobile endpoint device. For example, the user may prefer a certain formatting for printing documents, a certain number of copies, a group of contacts that they send documents to regularly (e.g., a list of emails), and the like. As a result, when the mobile endpoint device is paired with the output device, the user can simply push a button on the UI of the software application that is pre-configured with certain settings and the command can be sent to the output device for execution.

In one embodiment, the method 200 may be repeated if more than one mobile endpoint device needs to be registered. The method 200 ends at step 208.

Figure 3:
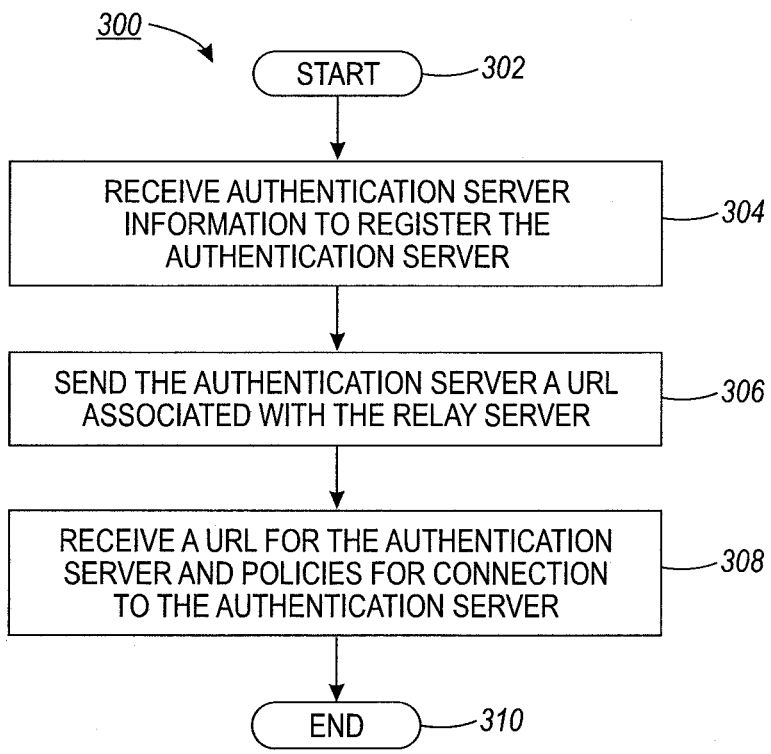
FIG. 3 illustrates an example flowchart of one embodiment of a method for registering an authentication server.

FIG. 3 illustrates a flowchart of a method 300 for registering an authentication server. In one embodiment, the method 300 may be performed by the relay server 108 or a general-purpose computer as illustrated in FIG. 5 and discussed below.

The method 300 begins at step 302. At step 304, the method 300 may receive authentication server information to register the authentication server with the relay server. For example, the authentication server information may include a communication protocol used by the authentication server, an address of the authentication server e.g., a Media Access Control (MAC) address, an IP address, and the like), a name of the authentication server, a physical location of the authentication server, a list of what output devices can be accessed by which users, and the like, a list of output devices that the authentication server manages the authentication for, information associated with each one of the output devices, and the like.

At step 306, the method 300 sends the authentication server a universal resource locator (URL) associated with the relay server. The authentication server may use the URL to establish a connection to the relay server and communicate with the relay server.

At step 308, the method 300 may receive a URL for the authentication server and policies for connection to the authentication server. For example, the URL may be used by the relay server to establish a connection to the authentication server and communicate with the authentication server.

After exchanging the above information, the authentication server is registered with the relay server. It should be noted that the method 300 may be repeated for each authentication server if more than one authentication server is deployed. The method ends at step 310.

Figure 4:
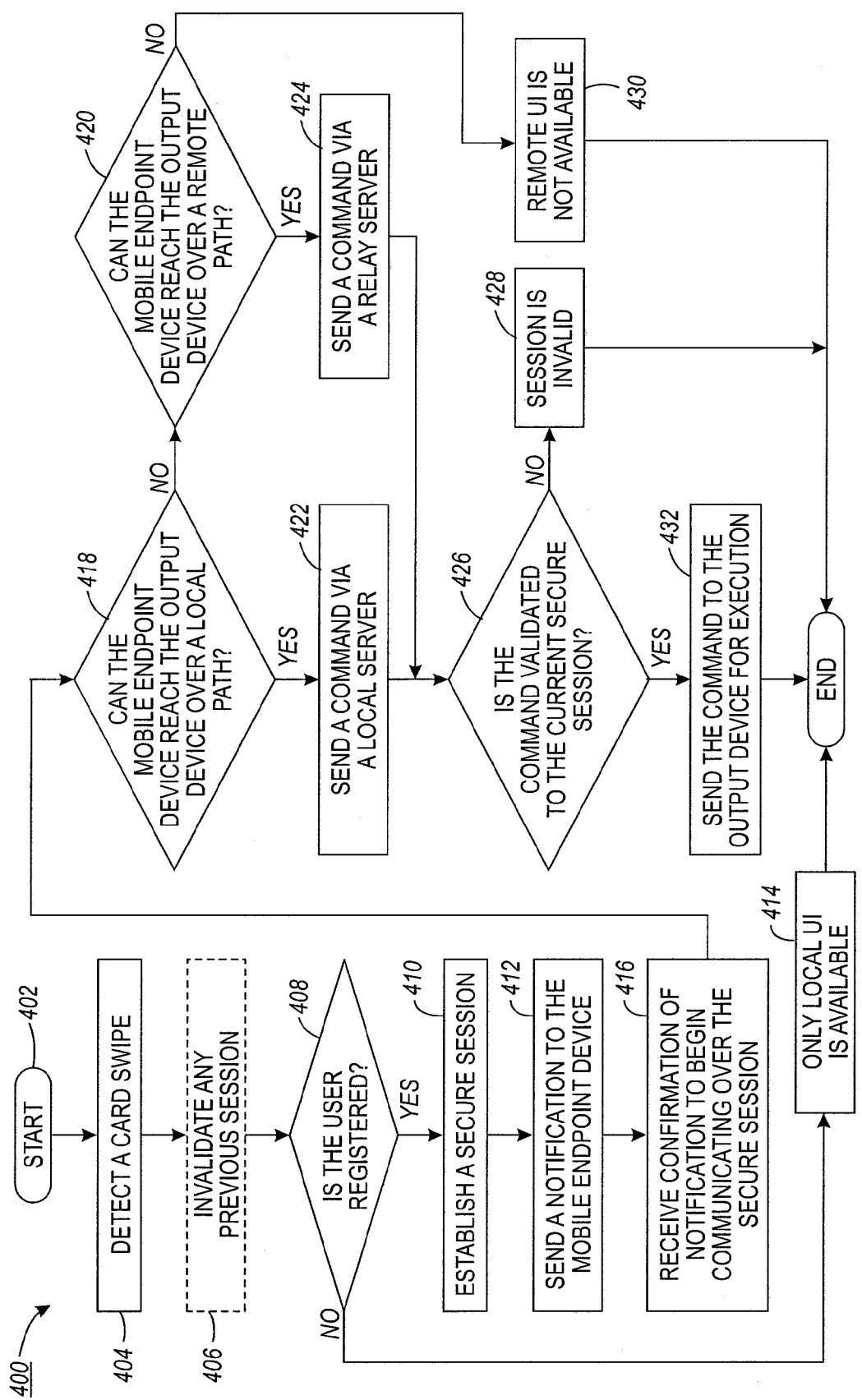
FIG. 4 illustrates an example flowchart of one embodiment of a method for automatically pairing a mobile endpoint device to an output device using a card swipe authentication.

FIG. 4 illustrates a flowchart of a method 400 for automatically pairing a mobile endpoint device to an output device using a card swipe authentication. In one embodiment, the method 400 may be performed by the relay server 108 or a general-purpose computer as illustrated in FIG. 5 and discussed below.

The method 400 begins at step 402. At step 404, the method 400 may detect a card swipe. For example, a user may approach an output device and swipe his or her access card on a card reader of the output device. In response, the notification of the card swipe detection may be sent to the relay server to initiate the pairing process. As a result, the relay server may know that the card swipe has been detected.

At optional step 406, the method 400 may invalidate any previous session. In one embodiment, this may be to ensure security for each session that is created. In other words, in one embodiment, only a single session between a mobile endpoint device and the output device may be active at any given time.

At step 408, the method 400 determines if the user is registered. For example, detecting the card swipe at step 404 may automatically initiate a communication from the output device to the authentication server. The authentication server may determine whether the user is authorized for remote UI access of the output device at the present time.

In addition, the authentication server may automatically initiate a message to the relay server to determine if the user is registered for pairing a mobile endpoint device to the output device. For example, the authentication server may use the information gathered during the registration in the method 300 discussed above, to connect to and communicate with the relay server. The authentication server may send the relay server information, such as for example, who the user is, what output device is being accessed, and the like.

The relay server may then determine if the user registered for remote UI access of the output device using his or her mobile endpoint device as discussed above in the method 200. For example, if the relay server finds the user identified by the authentication server is registered, the relay server may then identify the mobile endpoint device that was registered by the user. The relay server and the authentication server may then exchange configuration information to pair the mobile endpoint device with the output device and begin establishing the secure session.

At step 408, if the user is not registered, the method 400 may proceed to step 414. At step 414 the user is notified that only the local UI of the output device is available and the proceeds to step 434.

At step 408, if the user is registered, the method 400 may proceed to step 410. At step 410, the method 400 establishes a secure session between the output device and the mobile endpoint device. For example, the relay server may establish a connection to the mobile endpoint device and the authentication server. Alternatively, if the mobile endpoint device has a local path available directly to the authentication server, the authentication server may establish a connection to the mobile endpoint device as will be discussed below. As a result, a session may be established between the mobile endpoint device and the output device via the relay server and the authentication server or the authentication server alone.

The relay server may also send a unique session identifier to the authentication server. The unique session identifier may be sent with any commands from the mobile endpoint device to the output device to ensure that the commands are being sent over a valid and current session. In one embodiment, the relay server may also send an encryption key to the authentication server to encrypt communication between the mobile endpoint device and the output device. As a result, the session between the mobile endpoint device and the output device is also a secure session.

At step 412, the method 400 sends a notification to the mobile endpoint device. In one embodiment, the notification may be an email or a text message. In one embodiment, the notification may include configuration information that was used to establish the secure session. For example, the configuration information may include the unique session identifier that is to be sent with any commands issued by the mobile endpoint device to the output device. The configuration information may also include the encryption key used to encrypt the command.

At step 416, the method 400 may receive confirmation of the notification to begin communicating over the secure session. For example, the notification may include a message that asks the user if they would like to connect to the output device. If the user enters yes (e.g., for example, activating a link in the email or text message or pressing a yes button on the UI of the software application), the mobile endpoint device may send a confirmation message to the relay server that communications over the secure session will begin.

It should be noted that the user did not need to perform any actions to establish the secure session. For example, the user does not need to identify the output device for the mobile endpoint device that the user is trying to access or how to connect to the output device. In other words, by simply swiping the user's access card at the output device, the authentication server and the relay server automatically communicate and establish the secure session between the mobile endpoint device and the output device using the information collected during the registration of the mobile endpoint device and the authentication server without any interaction with the user. The only action the user needs to perform may be to submit a confirmation that the user does desire to have remote UI access or control of the output device with his or her mobile endpoint device.

At step 418, the method 400 determines if the mobile endpoint device can reach the output device over a local path. For example, the relay server may determine whether the mobile endpoint device is connected to the Wi-Fi network of the office or building where the user is located.

If the local path is not available, the method may proceed to step 420. At step 420, the method 400 determines if the mobile endpoint device can reach the output device over a remote path. For example, the relay server may determine whether the mobile endpoint device is connected to a cellular communication network or data network outside of the LAN or Wi-Fi network.

If the remote path is not available, the method may proceed to step 430. At step 430, the method 400 may inform the user that the remote UI is not available. For example, the mobile endpoint device may be unable to communicate over either Wi-Fi or the cellular network. As a result, the mobile endpoint device is unable to communicate with the output device and the user must use the local UI of the output device. The method 400 then proceeds to step 434.

Referring back to step 420, if the remote path is available, the method 400 may proceed to step 424. At step 424, the method 400 sends a command via the relay server. For example, the command may be sent to the relay server in the IP network or cellular communication network and forward the command to the authentication server in the LAN. The authentication server may then forward the command to the output device.

In one embodiment, the command may be any instruction to be executed by the output device. For example, if the output device is a printer, the command may be a print command. In another example, if the output device is a copier, the command may be a copy command. In another example, if the output device is a computer, the command may be a email command to forward a document to a group of email addresses.

The command may also include one or more specific parameters. For example, if the command is a print command, the command may include a selection of a pre-loaded form or layout, a specific font size, a specific margin width and height, a specific format, a specific color, and the like. In another example, if the command is a copy command, the command may include a number of copies, specific a duplex copy, and the like. The method 400 may then proceed to step 426.

Referring back to step 418, if the local path is available, the method 400 may proceed to step 422. At step 422, the method 400 may send a command via a local server. In one embodiment, the authentication server may be the local server. However, in one embodiment, the local server may be separate from the authentication server but in communication with the authentication server.

In one embodiment, the command may be similar to the command sent in step 424. In other words, the command may be any instruction to be executed by the output device. The method 400 may then proceed to step 426.

At step 426, the method 400 determines if the command is validated to the current secure session. For example, the authentication server may check to see if the unique session identifier that is sent with the command matches the unique session identifier that was sent from the relay server at step 410.

If the command is not validated to the current secure session, the method 400 may proceed to step 428. At step 428, the user is informed that the session is invalid. For example, before the user was able to send a command, a second user may swipe his or her card through the card reader at the output device. As a result, a new session with a different unique session identifier may have been issued by the relay server. As a result, the unique session identifier issued at step 410 may no longer be valid.

In another embodiment, the secure session may have a expiration timer or a inactive timer. For example, the secure session may be terminated after 1 minute of inactivity. As a result, the inactive timer may expire and the command may not be validated to the current session as the secure session has expired and been terminated.

Referring back to step 426, if the command is validated to the current secure session, the method 400 may proceed to step 432. At step 432, the method 400 sends the command to the output device for execution. For example, the authentication server forwards the command to the output device. The method 400 ends at step 434.

It should be noted that although not explicitly specified, one or more steps, functions, or operations of the methods 200, 300 and 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIGS. 2-4 that recite a determining operation, or involve a decision, do not necessarily require that both branches of the determining operation be practiced. In other words, one of the branches of the determining operation can be deemed as an optional step.

Figure 5:
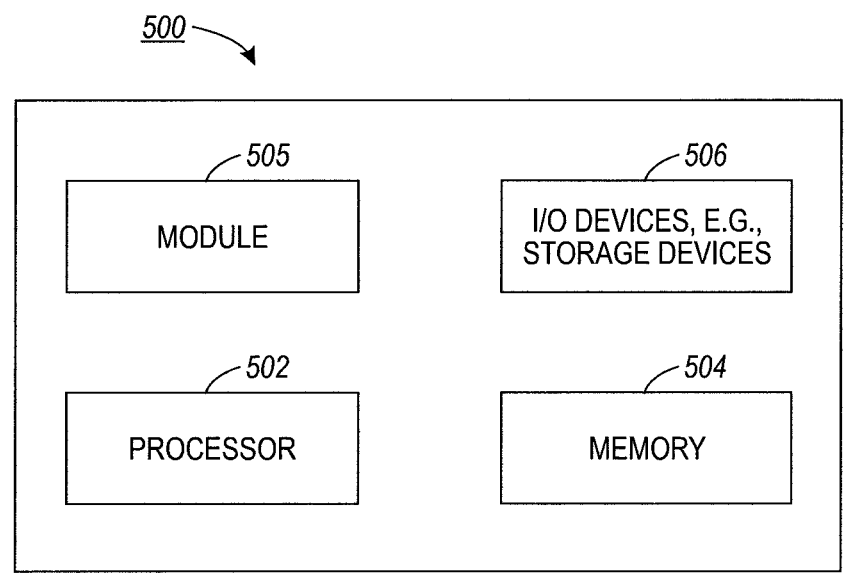
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for automatically pairing a mobile endpoint device to an output device using a card swipe authentication, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 505 for automatically pairing a mobile endpoint device to an output device using a card swipe authentication can be loaded into memory 504 and executed by processor 502 to implement the functions as discussed above. As such, the present method 505 for automatically pairing a mobile endpoint device to an output device using a card swipe authentication (including associated data structures) of the present disclosure can be stored on a non-transitory (e.g., physical and tangible) computer readable storage medium, e.g., RAM memory, magnetic or optical drive or diskette and the like. For example, the hardware processor 502 can be programmed or configured with instructions (e.g., computer readable instructions) to perform the steps, functions, or operations of methods 200, 300 and 400.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for pairing a mobile endpoint device to an output device using a card swipe authentication, comprising:
  registering the mobile endpoint device to be associated with an access card used to access the output device, wherein the output device comprises a printer;
  detecting a card swipe of the access card at the output device;
  identifying the mobile endpoint device that is authenticated to pair with the output device based upon the registering;
  establishing a secure session between the mobile endpoint device and the output device using a unique session identifier and configuration information without any user interaction after the card swipe;
  sending a notification to the mobile endpoint device, wherein the notification comprises the unique session identifier that was used to establish the secure session and pair the output device to the mobile endpoint device;
  receiving a single print command from the mobile endpoint device via the secure session after the secure session is established and after the notification is sent, wherein the single print command includes the unique session identifier and a plurality of pre-loaded parameters configured by a user to be executed by the output device; and
  forwarding the single print command to the output device to execute the single print command with the plurality of pre-loaded parameters when the unique session identifier is validated by the secure session, wherein the single print command is forwarded via a local authentication server when the secure session is established over a Wi-Fi network or the single print command is forwarded via a relay server when the secure session is established over a cellular communication network.

2. The method of claim 1, wherein the registering is performed using a software application downloaded and installed on the mobile endpoint device.

3. The method of claim 2, wherein the software application comprises a user customized interface that includes one or more pre-defined commands.

4. The method of claim 1, wherein the notification comprises at least one of: a text message or an email.

5. The method of claim 1, wherein the secure session ends upon a detection of at least one of: an expiration of a session timer or detecting a second card swipe at the output device.

6. A non-transitory computer-readable medium storing a plurality of instructions which, when executed by a processor, cause the processor to perform operations for pairing a mobile endpoint device to an output device using a card swipe authentication, the operations comprising:
  registering the mobile endpoint device to be associated with an access card used to access the output device, wherein the output device comprises a printer;
  detecting a card swipe of the access card at the output device;
  identifying the mobile endpoint device that is authenticated to pair with the output device based upon the registering;
  establishing a secure session between the mobile endpoint device and the output device using a unique session identifier and configuration information without any user interaction after the card swipe;
  sending a notification to the mobile endpoint device, wherein the notification comprises the unique session identifier that was used to establish the secure session and pair the output device to the mobile endpoint device;
  receiving a single print command from the mobile endpoint device via the secure session after the secure session is established and after the notification is sent, wherein the single print command includes the unique session identifier and a plurality of pre-loaded parameters configured by a user to be executed by the output device; and
  forwarding the single print command to the output device to execute the single print command with the plurality of pre-loaded parameters when the unique session identifier is validated by the secure session, wherein the single print command is forwarded via a local authentication server when the secure session is established over a Wi-Fi network or the single print command is forwarded via a relay server when the secure session is established over a cellular communication network.

7. The non-transitory computer-readable medium of claim 6, wherein the registering is performed using a software application downloaded and installed on the mobile endpoint device.

8. The non-transitory computer-readable medium of claim 7, wherein the software application comprises a user customized interface that includes one or more pre-defined commands.

9. The non-transitory computer-readable medium of claim 6, wherein the notification comprises at least one of: a text message or an email.

10. The non-transitory computer-readable medium of claim 6, wherein the secure session ends upon a detection of at least one of: an expiration of a session timer or detecting a second card swipe at the output device.

* * * * *